(12) United States Patent
Fujita et al.

(10) Patent No.: US 9,514,084 B2
(45) Date of Patent: Dec. 6, 2016

(54) POWER SAVING BASED ON CLOCK MANAGEMENT CLAIM OF PRIORITY

(71) Applicant: International Business Machines Corporation, Armonk, NY (US)

(72) Inventors: Norio Fujita, Shiga-Ken (JP); Masahiro Hori, Shiga-ken (JP); Masahiro Murakami, Kyoto (JP); Junka Okazawa, Kytoo (JP)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 13/945,321

(22) Filed: Jul. 18, 2013

(65) Prior Publication Data

US 2014/0025853 A1   Jan. 23, 2014

(30) Foreign Application Priority Data

Jul. 19, 2012   (JP) .................. 2012-160936

(51) Int. Cl.
G06F 13/40   (2006.01)
G06F 1/32   (2006.01)

(52) U.S. Cl.
CPC ............ *G06F 13/405* (2013.01); *G06F 1/324* (2013.01); *G06F 1/3253* (2013.01); *Y02B 60/1228* (2013.01); *Y02B 60/1235* (2013.01)

(58) Field of Classification Search
CPC ......... G06F 13/40; G06F 1/324; G06F 1/3253
See application file for complete search history.

(56) References Cited

U.S. PATENT DOCUMENTS

| 6,937,061 B1* | 8/2005 | Crosland | G06F 9/3879 326/105 |
| 2002/0052995 A1* | 5/2002 | Jahnke | G06F 13/4059 710/305 |
| 2005/0104634 A1* | 5/2005 | Fujishima | H03D 7/1441 327/117 |
| 2005/0216607 A1* | 9/2005 | Munguia | G06F 1/3203 710/15 |

(Continued)

FOREIGN PATENT DOCUMENTS

| JP | 5282082 A | 10/1993 |
| JP | 778042 A | 3/1995 |

(Continued)

*Primary Examiner* — Tim T Vo
*Assistant Examiner* — Phong H Dang
(74) *Attorney, Agent, or Firm* — L. Jeffrey Kelly

(57) ABSTRACT

The present invention provides a computer system including a CPU with an L2 cache, a bus master device and a bus slave device. They are connected via a system bus to communicate with each other. The computer system 100 includes: a transaction monitor 60 for monitoring first transaction states TrC1-TrCn between a CPU 20 and an L2 cache 25, and second transaction states from TrB0 to TrBn between a system bus 10 and the L2 cache 25, between the system bus 10 and a bus master device 30 or between the system bus 10 and bus slave devices 40, 42; and a clock generator 70 able to change the frequency FreqC1-FreqS2 of the clock of the CPU 20, the system bus 10, and the bus slave devices 40, 42 according to the first transaction and second transaction states received from the transaction monitor 60.

14 Claims, 2 Drawing Sheets

(56) References Cited

U.S. PATENT DOCUMENTS

| | | | |
|---|---|---|---|
| 2005/0216643 A1* | 9/2005 | Munguia | G06F 1/3203 710/309 |
| 2006/0053326 A1 | 3/2006 | Naveh et al. | |
| 2008/0005607 A1* | 1/2008 | Fukatsu | G06F 1/3225 713/600 |
| 2011/0106992 A1* | 5/2011 | Lee | G06F 1/3203 710/110 |
| 2012/0102345 A1* | 4/2012 | Park | G06F 1/3215 713/322 |
| 2012/0233488 A1* | 9/2012 | Burchard | G06F 1/3228 713/500 |
| 2013/0009687 A1* | 1/2013 | Matsuyama | G06F 1/08 327/299 |
| 2014/0025853 A1 | 1/2014 | Fujita et al. | |
| 2014/0222229 A1* | 8/2014 | Teranishi | G06F 1/324 700/291 |

FOREIGN PATENT DOCUMENTS

| | | | |
|---|---|---|---|
| JP | 997128 A | | 4/1997 |
| JP | 9128107 A | | 5/1997 |
| JP | 9284711 A | | 10/1997 |
| JP | 2005196430 A | * | 7/2005 |
| JP | 2008-217628 | | 9/2008 |
| JP | 2009-128107 | | 6/2009 |
| JP | 2009-545048 | | 12/2009 |
| JP | 2011190613 A | | 9/2011 |

\* cited by examiner

POWER SAVING BASED ON CLOCK MANAGEMENT CLAIM OF PRIORITY

CLAIM OF PRIORITY

The present application claims the benefit of priority of JP patent application 2012-160936, entitled "Computer System", filed Jul. 19, 2012, with the Japanese Patent and Trademark Office, the content of which is incorporated herein by reference in its entirety.

BACKGROUND

The present invention relates to a computer system and, more specifically, to saving power in a computer system by changing the frequency of the clock signals in the computer system.

In a computer system including a PC or server system equipped, saving power is an important factor in reducing the load on, for example, a power source, air conditioner or cooling device. In order to do so, as shown, for example, in Japanese PCT Application No. 2009-545048, Japanese Patent Publication No. 2008-217628 and Patent Publication No. 2009-128107, conditions such as the load, capacity utilization rate, and temperature (generated heat) of, for example, a CPU/GPU are monitored, and power saving actively realized in accordance with these conditions.

In this case, CPU/GPU capacity utilization is usually monitored by measuring the idle process percentage using software, and performing control according to capacity utilization using software. The control target can be dropping the frequency of the entire IC chip, or dropping the voltage of the power supply.

The method of the prior art is very effective at reducing power consumption, but it also causes the performance of the entire IC chip to drop. This causes problems such as a drop in performance by a bus master device other than the CPU.

SUMMARY

A purpose of the present invention is to realize power savings in a computer system by monitoring the transaction state of a system bus.

Another purpose of the present invention is to realize power savings without requiring the intervention of software in a computer system by using hardware to dynamically change the frequency of a clock according to the transaction state of the system bus.

The present invention provides a computer system including a CPU with an L2 cache, a bus master device and a bus slave device connected via a system bus to communicate with each other. This computer system includes: a transaction monitor for monitoring first transaction states between the CPU and the L2 cache, and second transaction states between the system bus and the L2 cache, between the system bus and the bus master device or between the system bus and the bus slave devices; and a clock generator able to change the frequency of the clock of the CPU, the system bus, and the bus slave devices according to the first transaction and second transaction states received from the transaction monitor.

In the computer system of the present invention, the frequency of the clock signals for the CPU can be changed in accordance with the first transaction state between the CPU and the L2 cache, and the frequency of the clock signals for the system bus and the bus slave device can be changed in accordance with the second transaction state between the system bus and the bus master device, and between the bus slave device and the L2 cache. As a result, the computer system of the present invention can realize power savings while maintaining overall computer system performance by inferring the activity state of the CPU, system bus and each device, and changing the frequency of the clocks for these devices in accordance with each activity state.

DETAILED DESCRIPTION

Figure 1:
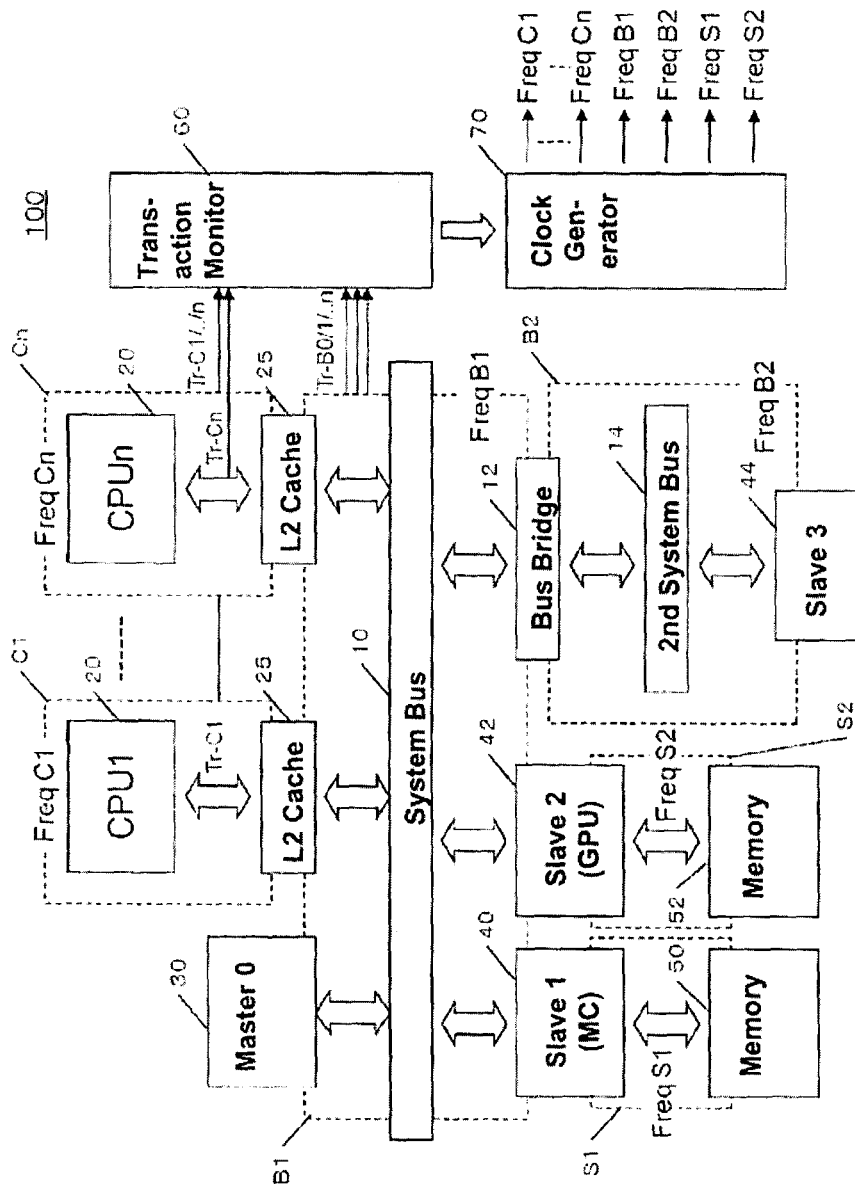
FIG. 1 is a block diagram showing a configuration example of a computer system of and embodiment of the present invention.

The following is an explanation of an embodiment of the present invention with reference to the drawings. FIG. 1 is a block diagram showing a configuration example of a computer system 100 of the present invention. The computer system 100 includes a CPU 20 with an L2 cache 25, as well as a bus master device 30 and bus slave devices 40, 42, 44 connected via a system bus 10 to communicate with each other. The computer system 100 also includes a transaction monitor 60 and a clock generator 70.

The CPU 20 can be a plurality of CPUs (1 through n), and each CPU 20 can have an L2 cache 25 (for use). The bus master device 30 is a device able to directly access bus slave devices and the like without intervention by the CPU 20. As in the case of the CPU, this can be a plurality of devices.

Bus slave device 40 can be, for example, a memory controller (MC), and is connected to memory (DRAM) 50 such as DDR memory. Bus slave device 42 can be, for example, a graphics processing unit (GPU), and is connected to memory (DRAM) 52 such as DDR memory. Bus slave device 44 is connected to a second system bus 14 connected, in turn, to the system bus 10 via a bus bridge 12.

Each device and bus in the configuration of FIG. 1 can be operated by its corresponding clock (clock frequency). More specifically, a plurality of CPUs ($1$-$n$) can be operated at the clock $FreqC1$-$FreqCn$ corresponding to each one. The system bus 10 can be operated at clock $FreqB1$. The bus slave devices 40, 42 can be operated, respectively, at clock $FreqS1$ and clock $FreqS2$. The second system bus 14 can be operated at clock $FreqB2$. The regions (blocks) C1-Cn, B1, B2, S1, S2 surrounded by dashed lines in FIG. 1 are regions (blocks) that are each operated by the corresponding clock as described above.

The transaction monitor 60 monitors the first transaction states $TrC1$-$TrCn$ between the CPU 20 and the L2 cache 25, and the second transaction states $TrB0$-$TrBn$ between the system bus 10 and the bus master device 30, and between bus slave devices 40, 42 and the L2 cache 25. The clock generator 70 can change and output the frequency $FreqC1$-$FreqCn$, $FreqB1$, $FreqB2$, $FreqS1$, $FreqS2$ of the clock for the CPU 20, the system bus 10, the second system bus 14 and the bus slave devices 40, 42 according to the first transaction state $TrC1$-$TrCn$ and the second transaction states $TrB0$-$TrBn$ received from the transaction monitor 60. The following is an explanation of the changes to each clock frequency.

Variation of CPU Clock Frequencies $FreqC1$-$FreqCn$

The transaction monitor 60 can detect activity by the CPU 20 by monitoring the transaction state TrC1-TrCn between the CPU 20 and the L2 cache 25. For example, when the transaction state TrC1 is low, all access to the CPU 1 hits in the L1 cache, or the CPU 1 is idle. However, because programs are usually implemented by the operating system, rather than continuing to hit the L1 cache, access to the L2 cache 25 occurs when the CPU 1 is active.

Therefore, when the transaction state TrC1 is low, the CPU 1 is determined to be idle, and the transaction monitor 60 instructs the clock generator 70 to reduce the clock frequency FreqC1 of the CPU 1. Conversely, when the transaction state TrC1 increases, the CPU 1 is determined to be active, and the transaction monitor 60 instructs the clock generator 70 to increase the clock frequency FreqC1 of the CPU 1. By performing the same operation on each CPU, the clock frequency of inactive CPUs 20 is automatically lowered, and power consumption decreased.

(b) Variation of Bus Clock Frequencies FreqB1, FreqB2

The transaction monitor 60 monitors the transaction state TrB0-TrBn from the L2 cache 25 and the bus master device 30 to the system bus 10. When the transaction state TrB0-TrBn is determined to be low via the system bus 10, the transaction monitor 60 instructs the clock generator 70 to lower the frequency of the bus clock FreqB1.

The transaction monitor 60 also analyzes (identifies) the address of the access request. When the transaction state to the second system bus 14 is determined to be low, it instructs the clock generator 70 to lower the clock frequency FreqB2 of the second system bus 14. Conversely, when the transaction state to the second system bus 14 is determined to have increased and the second system bus 14 is determined to be active, the transaction monitor 60 instructs the clock generator 70 to increase the frequency of the bus clock FreqB2. In this way, the bus clock frequency FreqB2 can be automatically lowered and power consumption reduced when the second system bus 14 is not active.

(c) Variation of Slave Clock Frequencies FreqS1, FreqS2

When the address of an access request has been analyzed and the transaction state to either bus slave device 40, 42 is determined to be low, the transaction monitor 60 instructs the clock generator 70 to reduce the clock frequency of the corresponding bus slave device (FreqS1 or FreqS2). Conversely, when the transaction state to the bus slave device 40, 42 is determined to have increased and the bus slave device is determined to be active, the transaction monitor 60 instructs the clock generator 70 to increase the clock frequency (FreqS1, FreqS2). In this way, the clock frequency of the corresponding bus slave device can be automatically lowered and power consumption reduced when a bus slave device is not active.

Figure 2:
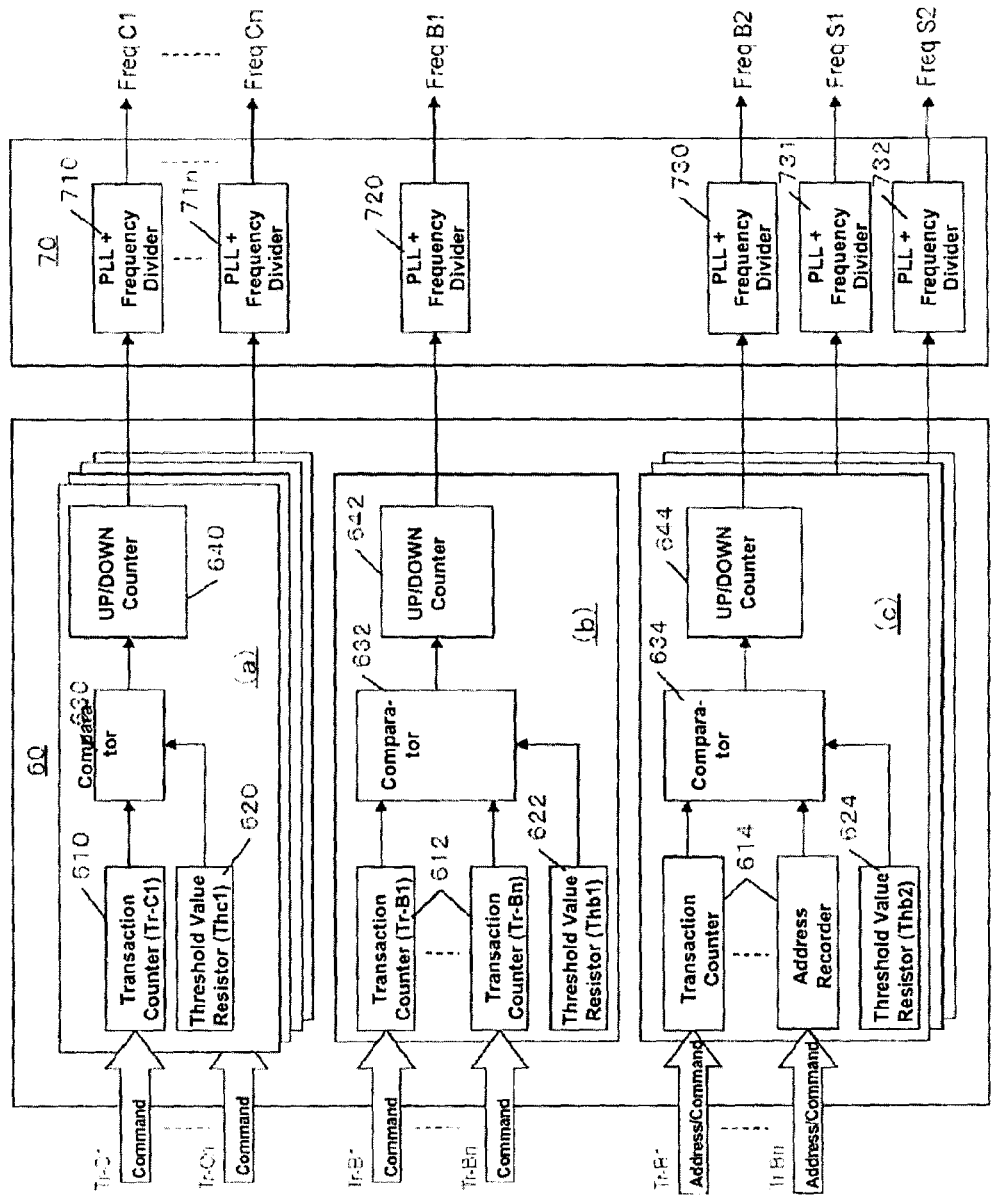
FIG. 2 is a block diagram showing a configuration example of a transaction monitor and a clock generator of an embodiment of the present invention.

FIG. 2 is a block diagram showing a configuration example of a transaction monitor and a clock generator of the present invention. The transaction monitor 60 includes three blocks (a)-(c). Block (a) corresponds to the changing of the CPU clock frequencies FreqC1-FreqCn in (a) described above. Block (b) corresponds to the changing of the bus clock frequencies FreqB1, FreqB2 in (b) described above. Block (c) corresponds to the changing of the bus clock frequencies FreqB1, FreqB2 in (b) described above and the changing of the slave clock frequencies FreqS1, FreqS2 in (c) described above. The clock generator 70 includes blocks 710-732 corresponding to each output of the transaction monitor 60, and each block includes a phase-locked loop (PLL) circuit and a frequency divider (1/N).

In the configuration for block (a) of the transaction monitor 60, there are (n) units corresponding to the number of CPUs 20 (1-*n*). Block (a) includes a transaction counter 610, a threshold value register 620, a comparator 630, and an up/down counter 640. The transaction counter 610 counts the number of transactions TrC1-TrCn between the CPU 20 and the L2 cache 25. The number of transactions TrC1-TrCn corresponds, for example, to the number of access requests to the L2 cache 25 by the CPU 20 per a predetermined number of clock increments.

The count value of the transaction counter 610 is compared by the comparator 630 to a predetermined threshold value stored in the threshold value register 620. The predetermined threshold value is set to the appropriate value experientially or experimentally as a reference value for determining whether all access to the CPU 20 hits in the L1 cache or the CPU 20 is idle. When the inputted count value is greater than the predetermined threshold value, a high (H) signal is outputted by the comparator 630. When equal to or less than the threshold value, a low (L) signal is outputted. The high (H) signal and low (L) signal correspond, respectively, to an active and idle CPU 20.

The up/down counter 640 may count a high (H) output from the comparator 630 as plus one (+1) and a low (L) output as minus one (−1). The output (count value) of the up/down counter 640 is inputted to block 710 of the clock generator 70, and is used to change parameter N of the frequency divider (1/N). In other words, when the output (count value) is high, parameter N of the frequency divider (1/N) is increased. As a result, the PLL output clock frequency FreqC1 is increased. Conversely, when the output (count value) is low, parameter N of the frequency divider (1/N) is decreased. As a result, the PLL output clock frequency FreqC1 is decreased. In this way, the clock frequencies FreqC1-FreqCn can be increased or decreased in accordance with the activity of each CPU 20 (CPU 1 to CPU n).

The configuration of block (b) in the transaction monitor 60 is essentially the same as the configuration of block (a), and the operation is also similar. However, a difference is that a plurality of transaction counters 612 is provided corresponding to the number of transactions to be monitored, and each transaction counter 612 counts the number of transactions TrB0-TrBn via the system bus 10 instead of the number of transactions TrC1-TrCn between the CPU 20 and the L2 cache 25. The number of transactions TrB0-TrBn corresponds, for example, to the number of access requests from the bus master device 40 or the number of access requests to the L2 cache via the system bus 10 per a predetermined number of clock increments. As in the case of block (a), the PLL output clock frequency FreqB1 can be changed based on the output (count value) of the up/down counter 642 and, as a result, the clock frequency FreqB1 can be increased or decreased in accordance with the activity of the system bus 10.

In the configuration of block (c) of the transaction monitor 60, unlike block (a) and block (b), the transaction counter 614 includes an address recorder. In the configuration of block (c), the number of counters corresponds to the number of bus slave devices. The address recorder analyzes (identifies) the address of an access request as described above, and is used to determine whether the transaction state (access) to either bus slave device is high or low. The transaction counter 614 counts the number of transactions (access requests) to the bus slave device identified (specified) by the address recorder. All other operations are the same as those in block (a) and block (b) described above. As in the other blocks, the corresponding PLL output clock frequencies FreqB2, FreqS1, FreqS2 can be changed based on the output (count) of the up/down counter 644 and, as a result, the corresponding clock frequency can be increased or decreased in accordance with the activity of the bus slave device.

As described above, the present invention monitors the transactions in the system bus, and lowers the clock frequency of an area (block) with a low operation rate without lowering the clock frequency of blocks with a high operation rate. In this way, power consumption can be reduced while maintaining the overall performance of the system. Also, the present invention can increase the clock frequency and return to normal operation in a short period of time when the operation rate of the area (block) with the low operation rate is increased. Because the present invention is performed automatically using hardware, there is no need to prepare special software.

Embodiments of the present invention were explained with reference to the drawings. However, the present invention is not limited to these embodiments. The present invention can be embodied in a manner that includes various improvements, modifications and variations based on the knowledge of those skilled in the art without departing from the scope of the invention.

We claim:

1. A computer system comprising:
   a CPU with an L2 cache, a bus master device and a bus slave device which directly communicate via a system bus;
   a transaction monitor for monitoring a transaction state between the CPU and the L2 cache, and a transaction state of the system bus, and a transaction state of the bus slave device, wherein the transaction monitor comprises:
     a first comparator to compare a number of transactions between the CPU and the L2 cache to a first threshold value stored in a first register, in response to a high output of the first comparator, a first up/down counter counts a plus one (+1), and in response to a low output of the first comparator the first up/down counter counts a minus one (−1);
     a second comparator to compare a number of system bus transactions to a second threshold value stored in a second register, in response to a high output of the second comparator, a second up/down counter counts a plus one (+1), and in response to a low output of the second comparator the second up/down counter counts a minus one (−1); and
     a third comparator to compare a number of bus slave device transactions to a third threshold value stored in a third register, in response to a high output of the third comparator, a third up/down counter counts a plus one (+1), and in response to a low output of the third comparator the third up/down counter counts a minus one (−1); and
   wherein each of the first comparator, the second comparator, and the third comparator outputs a high (H) signal when an inputted count value, received from each of a corresponding first transaction counter, second transaction counter, and third transaction counter, is greater than the corresponding first predetermined threshold value, second predetermined threshold value, and third predetermined threshold value, the high (H) signal of the first comparator corresponds to an active state of the CPU, the high (H) signal of the second comparator corresponds to an active state of the system bus, and the high (H) signal of the third comparator corresponds to an active state of the bus slave device and
   wherein the each of the first comparator, the second comparator, and the third comparator outputs a low (L) signal when an inputted count value, received from each of a corresponding first transaction counter, second transaction counter, and third transaction counter, is less than or equal to the corresponding first predetermined threshold value, second predetermined threshold value, and third predetermined threshold value, the low (L) signal of the first comparator corresponds to an idle state of the CPU, the low (L) signal of the second comparator corresponds to an idle state of the system bus, and the low (L) signal of the third comparator corresponds to an idle state of the bus slave device;
   a clock generator comprising a first phase lock loop circuit, a second phase lock loop circuit and a third phase lock loop circuit, each receiving as input a corresponding output of the first up/down counter, the second up/down counter and the third up/down counter, wherein:
     the first phase lock loop circuit adjusts a CPU clock frequency based on an output of the first up/down counter, such that an increase of the output of the first up/down counter results in an increase of the CPU clock frequency,
     the second phase lock loop circuit adjusts a system bus clock frequency based on an output of the second up/down counter, such that an increase of the output of the second up/down counter results in an increase of the system bus clock frequency, and
     the third phase lock loop circuit adjusts a slave device clock frequency based on the output of the third up/down counter, such that an increase of the output of the third up/down counter results in an increase of the slave device clock frequency.

2. The computer system of claim 1, wherein the transaction monitor further comprises: an address recorder for identifying the address of an access request to the bus slave device.

3. The computer system of claim 1, further comprising: a second bus slave device connected to a second system bus, which is connected to the system bus via a bus bridge.

4. The computer system of claim 1, wherein the bus slave device comprises a memory controller connected to a DRAM memory.

5. The computer system of claim 1, wherein the bus slave device comprises a graphics processing unit connected to a DRAM memory.

6. The computer system of claim 1, further comprising: a third bus slave device connected to the system bus.

7. The computer system of claim 1, wherein monitoring the transaction state of the system bus comprises monitoring transactions between the L2 cache and the system bus, and transactions between the bus master device and the system bus, and transactions between the bus slave device and the system bus.

8. A computer system comprising:
   a CPU with an L2 cache, a bus master device and a bus slave device, which directly communicate with each other via a system bus;
   a transaction monitor for monitoring a transaction state between the CPU and the L2 cache and a transaction state of the system bus, wherein the transaction monitor comprises:

a first comparator to compare a number of transactions between the CPU and the L2 cache to a first threshold value stored in a first register, in response to a high output of the first comparator, a first up/down counter counts a plus one (+1), and in response to a low output of the first comparator the first up/down counter counts a minus one (−1);

a second comparator to compare a number of system bus transactions to a second threshold value stored in a second register, in response to a high output of the second comparator, a second up/down counter counts a plus one (+1), and in response to a low output of the second comparator the second up/down counter counts a minus one (−1);

wherein each of the first comparator, and the second comparator outputs a high (H) signal when an inputted count value, received from each of a corresponding first transaction counter, and second transaction counter, is greater than the corresponding first predetermined threshold value, and second predetermined threshold value, the high (H) signal of the first comparator corresponds to an active state of the CPU, the high (H) signal of the second comparator corresponds to an active state of the system bus, and wherein each of the first comparator, the second comparator, outputs a low (L) signal when an inputted count value, received from each of a corresponding first transaction counter, and second transaction counter, is less than or equal to the corresponding first predetermined threshold value, and second predetermined threshold value, the low (L) signal of the first comparator corresponds to an idle state of the CPU, the low (L) signal of the second comparator corresponds to an idle state of the system bus, and a clock generator comprising a first phase lock loop circuit and a second phase lock loop circuit, each receiving as input a corresponding output of the first up/down counter and the second up/down counter, wherein:

the first phase lock loop circuit adjusts a CPU clock frequency based on an output of the first up/down counter, such that an increase of the output of the first up/down counter results in an increase of the CPU clock frequency, the second phase lock loop circuit adjusts a system bus clock frequency based on an output of the second up/down counter, such that an increase of the output of the second up/down counter results in an increase of the system bus clock frequency.

9. The computer system of claim 8, wherein the transaction monitor further comprises: an address recorder for identifying the address of an access request to the bus slave device.

10. The computer system of claim 8, further comprising: a second bus slave device connected to a second system bus connected which is connected to the system bus via a bus bridge.

11. The computer system of claim 8, wherein the bus slave device comprises a memory controller connected to a DRAM memory.

12. The computer system of claim 8, wherein the bus slave device comprises a graphics processing unit connected to a DRAM memory.

13. The computer system of claim 8, wherein monitoring the transaction state of the system bus comprises monitoring transactions between the L2 cache and the system bus, and transactions between the bus master device and the system bus, and transactions between the bus slave device and the system bus.

14. A computer system comprising:
a CPU with an L2 cache connected to a system bus;
a transaction monitor for monitoring a transaction state between the CPU and the L2 cache, device, wherein the transaction monitor comprises a comparator to compare a number of transactions between the CPU and the L2 cache to a threshold value stored in a register, wherein an up/down counter counts a plus one (+1) in response to a high output of the comparator, and a minus one (−1) in response to a low output of the comparator;
a clock generator comprising a phase lock loop circuit and receiving as input an output of the up/down counter, the phase lock loop circuit adjusts a CPU clock frequency based on the output of the up/down counter such that an increase in the output of the up/down counter results in an increase of the CPU clock frequency;
wherein the comparator outputs a high (H) signal when an inputted count value, received from a transaction counter, is greater than the predetermined threshold value stored in the resister, the high (H) signal corresponds to an active state of the CPU, and
wherein the comparator outputs a low (L) signal when an inputted count value, received from a transaction counter, is less than or equal to the predetermined threshold value stored in the register, the low (L) signal corresponds to an idle state of the CPU.

* * * * *